(12) United States Patent
Inoue et al.

(10) Patent No.: US 12,358,586 B2
(45) Date of Patent: Jul. 15, 2025

(54) HEADLIGHT DEVICE AND LEANING VEHICLE

(71) Applicant: YAMAHA HATSUDOKI KABUSHIKI KAISHA, Iwata (JP)

(72) Inventors: Takehiro Inoue, Shizuoka (JP);
Atsushi Kamo, Shizuoka (JP);
Takahiro Yamada, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 102 days.

(21) Appl. No.: 18/303,298

(22) Filed: Apr. 19, 2023

(65) Prior Publication Data

US 2023/0249771 A1 Aug. 10, 2023

Related U.S. Application Data

(63) Continuation-in-part of application No. PCT/JP2021/038717, filed on Oct. 20, 2021.

(30) Foreign Application Priority Data

Oct. 21, 2020 (JP) .................................. 2020-176820

(51) Int. Cl.
*B62J 6/023* (2020.01)
*B60Q 1/14* (2006.01)
*H05B 47/115* (2020.01)

(52) U.S. Cl.
CPC .............. *B62J 6/023* (2020.02); *B60Q 1/143* (2013.01); *H05B 47/115* (2020.01); *B60Q 2300/136* (2013.01); *B60Q 2300/42* (2013.01)

(58) Field of Classification Search
CPC .............. B60Q 1/143; B60Q 2300/136; B60Q 2300/42; B62J 6/023; H05B 47/115
See application file for complete search history.

(56) References Cited

U.S. PATENT DOCUMENTS

2017/0182929 A1* 6/2017 Sakamoto ................ B62J 6/023
2019/0126811 A1   5/2019 Kay et al.
2023/0001846 A1* 1/2023 Hori ........................... B62J 6/02

FOREIGN PATENT DOCUMENTS

EP    2676872 A1    12/2013
EP    2792584 A1 * 10/2014 .......... B60Q 1/0094
(Continued)

OTHER PUBLICATIONS

Search Report for application FR2111175, mailed on Mar. 14, 2023.

*Primary Examiner* — Alexander H Taningco
*Assistant Examiner* — Pedro C Fernandez
(74) *Attorney, Agent, or Firm* — Rabin & Berdo, P.C.

(57) ABSTRACT

A headlight device includes a headlight and a control device. The headlight includes a plurality of light sources that is configured to light one or more left oblique areas located in the ahead-driving direction of the leaning vehicle on the left, one or more right oblique areas located in the ahead-driving direction of the leaning vehicle on the right, and one or more lower areas located in the ahead-driving direction of the leaning vehicle. The control device controls the headlight to light at least the left oblique areas and the right oblique areas based on adaptive lighting control. At least one of the left oblique areas and at least one of the right oblique areas that are lit based on the adaptive lighting control spread more outwardly in a left-right direction than any of the lower areas.

7 Claims, 5 Drawing Sheets

(56) References Cited

FOREIGN PATENT DOCUMENTS

| | | | | |
|---|---|---|---|---|
| EP | 2792585 | A1 * | 10/2014 | ........... B60Q 1/0041 |
| EP | 3530556 | A1 * | 8/2019 | ............... B60Q 1/12 |
| EP | 3674601 | A1 | 7/2020 | |
| JP | 2018020683 | A | 2/2018 | |
| JP | 2018020772 | A | 2/2018 | |
| WO | 2018168249 | A1 | 9/2018 | |
| WO | 2019236601 | A2 | 12/2019 | |

* cited by examiner

HEADLIGHT DEVICE AND LEANING VEHICLE

CROSS REFERENCE TO RELATED APPLICATIONS

This is a continuation-in-part application of International Application PCT/JP2021/038717, filed on Oct. 20, 2021, which claims priority from a Japanese Patent Application No. 2020-176820, filed on Oct. 21, 2020, the contents of which are incorporated herein by reference.

TECHNICAL FIELD

The present teaching relates to a headlight device to be employed in a leaning vehicle and relates to a leaning vehicle.

BACKGROUND ART

In recent years, there exists a leaning vehicle that employs a headlight device that has an adaptive front-lighting function to conduct bright-dark control of the lighting of a plurality of areas in the ahead-driving direction of the vehicle depending on whether or not there is an oncoming vehicle and/or a vehicle ahead. Such a leaning vehicle is disclosed, for example, in International Publication WO 2018/168249.

CITATION LIST

Patent Literature

Patent Literature 1: International Publication WO 2018/168249

SUMMARY OF INVENTION

Technical Problem

An objective of the present teaching is to provide a headlight device with an adaptive front-lighting function to be employed in a leaning vehicle, the headlight device obtaining good visibility ahead and especially obliquely ahead.

Solution to the Problem

The present inventors conducted the following studies to solve the problem. The headlight device disclosed in Patent Literature 1 lights all of the plurality of areas including areas below a cut-off line (which will hereinafter be referred to as a horizontal reference line) as well as areas above the cut-off line when the leaning vehicle is moving straight ahead and when there are no oncoming vehicles or the like. When an oncoming vehicle or the like appears in any of the plurality of areas, this headlight device turns off the light for that area. This makes it possible to suppress glare towards the oncoming vehicle or the like while obtaining good visibility in the ahead-driving direction of the leaning vehicle.

The present inventors attempted to find a way other than the way used in Patent Literature 1 to obtain good visibility in the ahead-driving direction of the leaning vehicle. Then, the present inventors conducted studies about various running conditions of a leaning vehicle employing a headlight device with an adaptive front-lighting function. For example, when a rider is riding a leaning vehicle at night and is going straight ahead along an unfamiliar road, the rider may want to obtain information about the circumstances ahead, such as whether there is a curve ahead, whether there are any trees, buildings, etc. ahead, and the like, as early as possible. Also, for example, when the leaning vehicle is moving straight ahead and is about to turn, the rider may want to obtain information beforehand about the circumstances ahead in the direction of the turn. Additionally, when the vehicle body of the leaning vehicle leans, the headlight device mounted on the vehicle body also leans. Thus, along with a lean of the vehicle body of such a leaning vehicle, the area that is lit by the headlight device (light distribution) shifts. The vehicle body leans mainly when the leaning vehicle turns, and the area lit by the headlight during a straight movement of the leaning vehicle may not be lit any more when the leaning vehicle turns. Because of such structural characteristics of a leaning vehicle, the rider may want to obtain information, prior to making a turn, about the circumstances ahead in the direction of the turn. The inventors conducted studies to obtain good visibility ahead in such cases.

Of the light emitted from the headlight device, the light emitted towards a lower area located below the horizontal reference line improves mainly the visibility of a place near to the leaning vehicle. On the other hand, the light emitted towards a higher area located above the horizontal reference line improves mainly the visibility of a place far from the leaning vehicle. Therefore, the present inventors found out that when the leaning vehicle is moving straight ahead, in order to allow the rider to obtain information at an early time about the circumstances ahead in the direction of movement as described above, the lighting of the higher area above the horizontal reference line should be controlled. In order to light a place further ahead in the direction of movement of the leaning vehicle, simply lighting an area located further above the horizontal reference line is sufficient. For example, a light source for high beam should be faced more upward. However, this merely results in lighting of a narrow point that is far ahead in the direction of movement of the leaning vehicle, and the rider still cannot see well whether there is a curve, whether there are any trees, buildings, etc., around the point. Then, the present inventors found out that lighting a larger area above the horizontal reference line while the leaning vehicle is moving straight ahead allows the rider not only to see the point far straight ahead in the direction of movement of the leaning vehicle but also to have information about the circumstances in an area the leaning vehicle will possibly move to later, thereby obtaining good visibility ahead and especially obliquely ahead.

The present teaching has been accomplished based on these studies and findings.

(1) A headlight device according to an embodiment of the present teaching is employed in a leaning vehicle that leans a vehicle body leftward when turning left and leans the vehicle body rightward when turning right. The headlight device includes a headlight and a control device. The headlight is configured to light one or more left oblique areas that are located in the ahead-driving direction of the leaning vehicle on the left, the one or more left oblique areas each having a maximum luminous intensity point above a horizontal reference line, one or more right oblique areas that are located in the ahead-driving direction of the vehicle on the right, the one or more right oblique areas each having a maximum luminous intensity point above the horizontal reference line, and one or more lower areas that are located in the ahead-driving direction of the leaning vehicle, the one or more lower areas each having a maximum luminous intensity point below the horizontal reference line. The control device controls the lighting of at least the one or more left oblique areas and the one or more right oblique areas by the headlight based on adaptive lighting control. The adaptive lighting control is set for controlling the lighting by the headlight such that when there is an oncoming vehicle or a vehicle ahead in an area lit by the headlight, the light for the area is reduced or turned off. When the leaning vehicle is upright, the control device instructs the headlight to light at least one of the one or more left oblique areas, at least one of the one or more right oblique areas and at least one of the one or more lower areas. At the time, the at least one of the one or more left oblique areas and the at least one of the one or more right oblique areas that are lit based on the adaptive lighting control each spread more outwardly in a left-right direction than any of the one or more lower areas.

With the headlight device of (1) above, when the leaning vehicle is upright and when there are no oncoming vehicles and/or vehicles ahead, the control device controls the headlight such that out of the one or more left oblique areas, the one or more right oblique areas and the one or more lower areas, all have at least one area lit. This obtains good visibility in the ahead-driving direction of the leaning vehicle. When there is an oncoming vehicle and/or a vehicle ahead in the left oblique area and/or the right oblique area, the control device instructs the headlight to reduce or turn off the light for that left oblique area and/or that right oblique area where the oncoming vehicle and/or a vehicle ahead is present. This makes it possible to suppress glare towards the oncoming vehicle and/or the vehicle ahead.

The headlight of the headlight device can light the one or more left oblique areas having a maximum luminous intensity point above the horizontal reference line and the one or more right oblique areas having a maximum luminous intensity point above the horizontal reference line. The one or more left oblique areas and the one or more right oblique areas each spread more outwardly in the left-right direction than any of the one or more lower areas. Accordingly, before the leaning vehicle turns, a large area ahead in the direction in which the leaning vehicle is about to turn is illuminated, and good visibility obliquely ahead can be obtained.

(2) In the headlight device of (1) above, when the headlight is configured to light a plurality of left oblique areas, a plurality of right oblique areas, and the one or more lower areas, the plurality of left oblique areas may be located at different heights in an up-down direction, and the plurality of right oblique areas may be located at different heights in the up-down direction. In this case, among the plurality of left oblique areas and among the plurality of right oblique areas, of which the lighting is controlled based on the adaptive lighting control, any left or right oblique area located higher may spread more outwardly in the left-right direction than any other left or right oblique area located lower, and at least one of the plurality of left oblique areas and at least one of the plurality of the right oblique areas may each spread more outwardly in the left-right direction than any of the one or more lower areas.

With the headlight device of (2) above, a place in the ahead-driving direction of the leaning vehicle on the left and a place in the ahead-driving direction of the leaning vehicle on the right lit by the headlight are divided into the plurality of left oblique areas and the plurality of right oblique areas, respectively. By controlling the lighting of the plurality of left oblique areas and the plurality of right oblique areas based on the adaptive lighting control, more detailed settings for lit areas are made available. For example, it is possible to instruct the headlight to emit a reduced amount of light or to emit no light only towards one or some of the left oblique areas where a vehicle ahead and/or an oncoming vehicle is present, but to emit a normal amount of light towards the other left oblique area(s). Also, for example, as the vehicle body leans, one or more of the left oblique areas, which are initially located above the horizontal reference line when the leaning vehicle is upright, may come down to be below the horizontal reference line. In such a case, the rider may want to reduce or turn off the light for the left oblique area(s) located below the horizontal reference line to avoid having light reflection from the road, or the like. When there are a plurality of left oblique areas and the vehicle body turns left, it is possible to instruct the headlight to emit a reduced amount of light or no light towards the left oblique area(s) located below the horizontal reference line but to emit a normal amount of light towards the left oblique area(s) located above the horizontal reference line. Thus, when there are a plurality of left oblique areas and a plurality of right oblique areas, lighting adaptable for various running conditions are made available, and good visibility in the ahead-driving direction of the leaning vehicle is obtained.

(3) In the headlight device of (1) or (2) above, the one or more left oblique areas, the one or more right oblique areas and the one or more lower areas are preferably areas defined by the lighting having a luminous intensity of a specified candela value or more.

With the headlight device of (3), the one or more left oblique areas, the one or more right oblique areas and the one or more lower areas are bordered by the specified candela value. This makes it possible to grasp the shapes of the respective areas more clearly.

(4) In the headlight device of any one of (1) to (3) above, when the leaning vehicle is upright and when the control device instructs the headlight to light at least one of the one or more left oblique areas, at least one of the one or more right oblique areas and at least one of the one or more lower areas, the total amount of light for the lighting of the one or more lower areas is preferably equal to or greater than the amount of light for the lighting of each of the at least one of the left oblique areas or for the lighting of each of the at least one of the right oblique areas that is controlled by the adaptive lighting control.

With the headlight device of (4), it is possible to suppress excessive lighting of the one or more left oblique areas and the one or more right oblique areas located above the horizontal reference line.

(5) A leaning vehicle according to an embodiment of the present teaching includes the headlight device according to any one of (1) to (4) above.

The "leaning vehicle", for example, includes at least one front wheel and at least one rear wheel. The leaning vehicle may be a straddled vehicle. The straddled vehicle is a vehicle that a rider sits on like straddling a saddle. The leaning vehicle may include a sit-in type seat. The leaning vehicle, for example, includes a drive source that supplies impelling force to the leaning vehicle. The drive source may be an engine, an electric motor, or a combination of an engine and an electric motor. The leaning vehicle, for example, includes a vehicle body that, when the leaning vehicle turns left or right, leans in the direction of the turn. Specifically, when the leaning vehicle turns left, the vehicle body leans leftward, and when the leaning vehicle turns right, the vehicle body leans rightward. The vehicle body includes a vehicle body frame. The vehicle body frame may be a frame constructed by assembling a plurality of parts or a frame formed by integrally molding a plurality of parts. The material of the vehicle body frame may be metal, such as aluminum, iron or the like, synthetic resin, such as CFRP or the like, or a combination of such metal and synthetic resin. The vehicle frame may be a monocoque structure that is structured by exterior parts of the leaning vehicle or a semi-monocoque structure of which some part serves also as exterior parts of the leaning vehicle.

The "headlight" functions to light in the ahead-driving direction of the leaning vehicle so that the rider can see ahead better. The headlight is positioned in the front part of the leaning vehicle. For example, the headlight is positioned higher than the front wheel and in front of the steering handle. The headlight is attached to the vehicle body. For example, the headlight is attached to a head pipe, which is a component of the vehicle body, via a bracket. When the vehicle body leans, the headlight leans along with the vehicle body. The headlight is a fixed light distribution type, and the headlight is configured to maintain its physical settings for light distribution even when the vehicle body leans.

The headlight includes a plurality of light sources that emit light in the ahead-driving direction of the leaning vehicle, and a case that encases the plurality of light sources. The plurality of light sources may be contained in a single case or may be individually contained in separate cases. The light sources, for example, are light emitting diodes, semiconductor lasers, HID (high-intensity discharge) bulbs, halogen lamps, incandescent bulbs, or the like. The light sources may cast light directly towards the place in the ahead-driving direction of the leaning vehicle or may illuminate the place in the ahead-driving direction of the leaning vehicle via light-reflective members. The case, for example, includes a case body and an outer lens positioned in front of the case body. The outer lens is attached to the case body at a position in front of the light sources.

The lit "area" corresponds to an image that is formed by light emitted from the headlight and projected onto a plane that is perpendicular to a front-back direction and is in the ahead-driving direction of the leaning vehicle at a specified distance. The area lit by the headlight corresponds to what is called screen light distribution. One area may be defined by light emitted from one light source or may be defined by light emitted from a plurality of light sources. The number of areas may be equal to the number of light sources of the headlight or may be smaller than the number of light sources of the headlight. The area is defined by light emitted from the headlight and does not include any areas defined by light from any lighting device other than the headlight, such as a turn signal indicator, a fog lamp, a positioning light, or the like. The plurality of areas is settled in such a manner so as to keep a fixed relative positional relationship with one another even when the vehicle body leans.

The area is such that has a luminous intensity of a specified value or more. The specified luminous intensity is, for example, 100 cd (candela). The outline of an area is defined by the specified luminous intensity. For example, the outline of an area corresponds to an iso-intensity curve of 100 cd.

When the leaning vehicle is upright, the "one or more left oblique areas" are located basically above the horizontal reference line and more leftward than the center, with respect to the left-right direction, of the leaning vehicle. The one or more left oblique areas mainly contribute to an improvement in the visibility ahead before the leaning vehicle turns left.

The shape of one left oblique area is not particularly limited, but it is preferred that one left oblique area has a shape that increases in width while spreading leftward. For example, one left oblique area has a fan-like shape spreading from the center, with respect to the left-right direction, of the horizontal reference line. For example, one left oblique area may have a trapezium-like shape that increases in width while spreading leftward.

The plurality of left oblique areas is arranged in line in the up-down direction. When the leaning vehicle is upright, the maximum luminous intensity points in the respective left oblique areas are at different heights in the up-down direction. For example, the plurality of left oblique areas is arranged radially from the center, with respect to the left-right direction, of the horizontal reference line. The plurality of left oblique areas may have the same shape or may have different shapes from one another. Two left oblique areas arranged adjacently in the up-down direction may, but need not, overlap each other. More specifically, of any two left oblique areas arranged adjacently in the up-down direction, the lower edge of the higher located left oblique area may be positioned lower than or higher than the upper edge of the lower located left oblique area. The lower edge of the left oblique area that is located lowest among the plurality of left oblique areas may be positioned lower than or higher than the horizontal reference line.

When the leaning vehicle is upright, the "one or more right oblique areas" have a shape symmetrical with the one or more left oblique areas with respect to a line extending parallel to the up-down direction through the center, with respect to the left-right direction, of the leaning vehicle. The one or more right oblique areas can be described by switching the word "left" to "right" in the above description of the one or more left oblique areas, and therefore, any detailed description of the one or more right oblique areas is not given.

The "maximum luminous intensity point" is such that has a maximum luminous intensity in the target area. The maximum luminous intensity point is located substantially in the center of the target area. The maximum luminous intensity point being located above the horizontal reference line means that the area including the maximum luminous intensity point is located mostly above the horizontal reference line. More specifically, regarding an area having a maximum luminous intensity point above the horizontal reference line, for example, half or more of the area in square measure is located above the horizontal reference line. In an area having a maximum luminous intensity point above the horizontal reference line, the portion of the area located above the horizontal reference line is greater in square measure than the portion of the area located below the horizontal reference line. Similarly, regarding an area having a luminous intensity point located below the reference horizontal line, for example, half or more of the area in square measure is located below the horizontal reference line. In an area having a maximum luminous intensity point located below the horizontal reference line, the portion of the area located below the horizontal reference line is greater in square measure than the portion of the area located above the horizontal reference line.

The headlight is only required to be configured to light at least the one or more left oblique areas, the one or more right oblique areas and the one or more lower oblique areas, and the headlight may be configured to additionally light any other area. The any other area is, for example, a high-beam area located between the one or more left oblique areas and the one or more right oblique areas. When the leaning vehicle is upright, the high-beam area is mostly located above the horizontal reference line and in the center with respect to the left-right direction. The high-beam area mainly contributes to an improvement in the visibility ahead while the leaning vehicle is moving straight ahead, as compared with lighting only by low beam. The shape of the high-beam area is not particularly limited. For example, the high-beam area has a semicircular shape with a curved upper edge. The lower edge of the high-beam area may be below the horizontal reference line or may be above the horizontal reference line. The high-beam area may, but need not, overlap the one or more left oblique areas and/or the one or more right oblique areas. More specifically, the left edge of the high-beam area may be positioned more leftward or more rightward than the right edge of the one or more left oblique areas. The right edge of the high-beam area may be positioned more rightward or more leftward than the left edge of the one or more left oblique areas.

When the leaning vehicle is upright, the "one or more lower areas" are located basically below the horizontal reference line. The one or more lower areas mainly contribute to an improvement in the visibility ahead when the leaning vehicle is moving straight ahead. If the headlight is configured to light the high-beam area, the one or more lower areas mainly contribute to an improvement in the visibility of a place nearer ahead than the high-beam area.

When there is only one lower area, the lower area has, for example, a semi-elliptical shape with a curved lower edge and serves as low beam. The upper edge of the low area is on the horizontal reference line.

When there is a plurality of lower areas, the plurality of lower areas is, for example, located in the ahead-driving direction of the leaning vehicle in the center, on the left and on the right, respectively. The lighting of the plurality of lower areas may be controlled by the adaptive lighting control.

The center lower area is defined as a low-beam area. The center lower area is located between the left lower area and the right lower area. More specifically, the maximum luminous intensity point in the center lower area is located between the maximum luminous intensity point in the left lower area and the maximum luminous intensity point in the right lower area with respect to the left-right direction. The center lower area contributes to an improvement in the visibility of a place nearer ahead than the high-beam area. The shape of the center lower area is not particularly limited. For example, the center lower area has a semicircular shape with a curved lower edge. The upper edge of the center lower area is on the horizontal reference line. The center lower area may, but need not, overlap, the left lower area and/or the right lower area. More specifically, the left edge of the center lower area may be positioned more leftward or more rightward than the right edge of the left lower area. The right edge of the center lower area may be positioned more rightward or more leftward than the left edge of the right lower area.

When the leaning vehicle is upright, the left lower area is located basically below the horizontal reference line and more leftward than the center, with respect to the left-right direction, of the leaning vehicle. The shape of the left lower area is not particularly limited, but it is preferred that the left lower area has a shape that increases in width while spreading leftward. The left lower area contributes to an improvement in the visibility of a place ahead on the left more than the center lower area.

There may be a plurality of left lower areas. The shape of the plurality of left lower areas is not particularly limited. For example, the plurality of left lower areas each have a fan-like shape spreading from the center, with respect to the left-right direction, of the horizontal reference line. For example, the plurality of left lower areas may each have a trapezium-like shape that increases in width while spreading leftward.

The plurality of left lower areas is, for example, arranged in line in the up-down direction. When the leaning vehicle is upright, the respective maximum luminous intensity points in the plurality of left lower areas are at different heights in the up-down direction. For example, the plurality of left lower areas is arranged radially from the center, with respect to the left-right direction, of the horizontal reference line. The plurality of left lower areas may have the same shape or may have different shapes from one another. Two left lower areas arranged adjacently in the up-down direction may, but need not, overlap each other. More specifically, of any two left lower areas arranged adjacently in the up-down direction, the lower edge of the left lower area that is located higher may be positioned lower than or higher than the upper edge of the left lower area that is located lower. The upper edge of the left lower area that is located highest among the plurality of left lower areas may be positioned lower than or higher than the horizontal reference line.

The one or more right lower areas have a shape symmetrical with the one or more left lower areas with respect to a line extending parallel to the up-down direction through the center, with respect to the left-right direction, of the leaning vehicle. The one or more right lower areas can be described by switching the word "left" to "right" in the above description of the one or more left lower areas, and therefore, any detailed description of the one or more right lower area is not given.

The phrase "spread more outwardly" means that an area located above the horizontal reference line has a greater dimension in the left-right direction than an area located below the horizontal reference line when the leaning vehicle is upright. More specifically, in the case in which there is one left oblique area, one right oblique area and one lower area, when the leaning vehicle is upright, the left edge of the left oblique area is positioned more leftward than the left edge of the lower area, and the right edge of the right oblique area is positioned more rightward than the right edge of the lower area. In the case in which there are a plurality of left oblique areas, a plurality of right oblique areas and one lower area, of the left oblique area located nearest to the horizontal reference line, at least its left edge is positioned more leftward than the left edge of the lower area, and of the right oblique area located nearest to the horizontal reference line, at least its right edge is positioned more rightward than the right edge of the lower area. In the case in which there is one left oblique area, one right oblique area and a plurality of lower areas, the left edge of the left oblique area is positioned more leftward than any of the left edges of all the lower areas, and the right edge of the right oblique area is positioned more rightward than any of the right edges of all the lower areas. In the case in which there are a plurality of left oblique areas, a plurality of right oblique areas and a plurality of lower areas, of the left oblique area located nearest to the horizontal reference line, at least its left edge is positioned more leftward than any of the left edges of all the lower areas, and of the right oblique area located nearest to the horizontal reference line, at least its right edge is positioned more rightward than any of the right edges of all the lower areas. In the case in which the lighting of the plurality of lower areas is controlled by the adaptive lighting control, at least one left oblique area lit based on the adaptive lighting control and at least one right oblique area lit based on the adaptive lighting control each spread more outwardly in the left-right direction than any of the one or more lower areas lit based on the adaptive lighting control.

The "horizontal reference line" corresponds to a low beam cut-off line. When the leaning vehicle is upright, the horizontal reference line extends in the left-right direction of the leaning vehicle through the upper edge of an area serving as a low-beam area.

The "control device" is, for example, an ECU (electric control unit). The ECU is realized, for example, by a combination of an IC (integrated circuit), an electronic component, a circuit board, etc. The control device may be contained in the case for the headlight or may be contained in another case. The control device performs the control, for example, when a CPU (central processing unit) reads a program stored in a non-volatile memory, performs predetermined processing following the program, and the like.

The control device can perform the adaptive lighting control to control the lighting by the headlight such that when there is an oncoming vehicle or a vehicle ahead in an area lit by the headlight, the light for the area is reduced or turned off. Here, the oncoming vehicle is one that is moving in a direction opposite to the direction of movement of the leaning vehicle employing the headlight device, and the oncoming vehicle is not particularly limited. The vehicle ahead is one that is moving in the same direction as the direction of movement of the leaning vehicle employing the headlight device, and the vehicle ahead is not particularly limited. The vehicle ahead is not necessarily running in the same traffic lane as the leaning vehicle employing the headlight device.

In order to determine whether an oncoming vehicle and/or a vehicle ahead is present or not, the leaning vehicle, for example, includes a detection device that detects an oncoming vehicle and/or a vehicle ahead. When the detection device detects an oncoming vehicle and/or a vehicle ahead, the detection device sends a signal to the control device. The control device determines the presence or non-presence of an oncoming vehicle and/or a vehicle ahead, based on the signal received from the detection device. The detection device may be attached to the headlight device. For example, the detection device is contained in the case for the headlight device. The detection device may be positioned separately from the headlight device in such a manner so as to be able to communicate with the headlight device either by wire or wirelessly. Such a detection device is, for example, a photosensor that can detect light emitted from an oncoming vehicle and/or a vehicle ahead.

Reducing or turning off the light may be done only for the area where there is an oncoming vehicle and/or a vehicle ahead, or alternatively may be done not only for the area where the oncoming vehicle and/or the vehicle ahead are present but also for any other additional area(s). The other additional area(s) may be, for example, areas around the area where the oncoming vehicle and/or the vehicle ahead are present.

The phrase "reducing the light" means reducing the amount of light for a target area to an amount that is smaller than the amount of light to light the target area when there is no oncoming vehicle and/or vehicle ahead. For example, when there is no oncoming vehicle or vehicle ahead in a target area, a light source for the area emits an amount of light that is greater than half of the maximum amount of light that can be emitted from the light source. When there is an oncoming vehicle and/or a vehicle ahead in the target area, the control device instructs the light source for the area to emit an amount of light that is smaller than half of the maximum amount of light that can be emitted from the light source.

The control device may be able to perform not only the adaptive lighting control but also any other controls. The other controls may be, for example, cornering lighting control, high-beam control, etc. The cornering lighting control is, for example, controlling the lighting such that the areas located above the horizontal reference line are unlit when the leaning vehicle is upright and such that the areas are lit when the vehicle body leans. The high-beam control is, for example, to control the lighting such that a high-beam area located above the horizontal reference line and a lower area located below the horizontal reference line are lit. The control to be performed by the control device may be selectable from a variety of controls manually or automatically.

In the case in which the control to be performed by the control device is switchable manually, for example, the control device can receive a signal sent from an input device when the input device is operated by the rider. The operation of the input device conducted by the rider includes contact operation and non-contact operation to the input device. The input device may be dedicated for operation of the headlight device or may be used for other purposes. In the case in which the control to be performed by the control device is switchable automatically, for example, the control device is connected either by wire or wirelessly to a communication device that can communicate with a device outside the leaning vehicle. The control device can receive signals from the communication device, and upon receiving a signal, the control device can acquire information as a communication result. The information is not particularly limited, and the information may be, for example, information about the time of sunrise, the time of sunset, etc., information about weather, such as sunny, rainy, etc., information about brightness, and so on.

The control device, for example, is connected to one or more sensors attached to the leaning vehicle either by wire or wirelessly and can receive signals from the one or more sensors. The sensors are not particularly limited. The sensors may be, for example, a sensor relevant to the lean angle of the leaning vehicle, a sensor relevant to the brightness around the leaning vehicle, etc. The sensors may be, for example, a roll angle sensor, a roll rate sensor, an IMU (inertial measurement unit), an illuminance sensor, etc.

Some embodiments of the present teaching will hereinafter be described in detail with reference to the drawings, and the detailed description of the embodiments will provide a clearer picture of the above-mentioned object and other objects, the features, the aspects and the advantages of the present teaching. The term "and/or" used herein includes one of the associated items in a list and all possible combinations of the associated items. The terms "including", "comprising", or "having", and variations thereof used herein specify the presence of stated features, steps, operations, elements, components, and/or equivalents thereof, and can include one or more of the steps, operations, elements, components, and/or their groups. Unless otherwise defined, all terms (including technical and scientific terms) used herein have the same meanings as commonly understood by one of ordinary skill in the art to which the present teaching pertains. It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein. It should be understood that the description of the present teaching discloses a number of techniques and steps. Each of these has an individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Effect of Invention

The present teaching provides a headlight device with an adaptive front-lighting function to be employed in a leaning vehicle, the headlight device obtaining good visibility ahead, and especially obliquely ahead.

DESCRIPTION OF EMBODIMENTS

With reference to the drawings, a leaning vehicle according to an embodiment of the present teaching will hereinafter be described in detail. The embodiment described below is merely an example. The present teaching shall not be considered limited to the embodiment below.

Figure 1A:
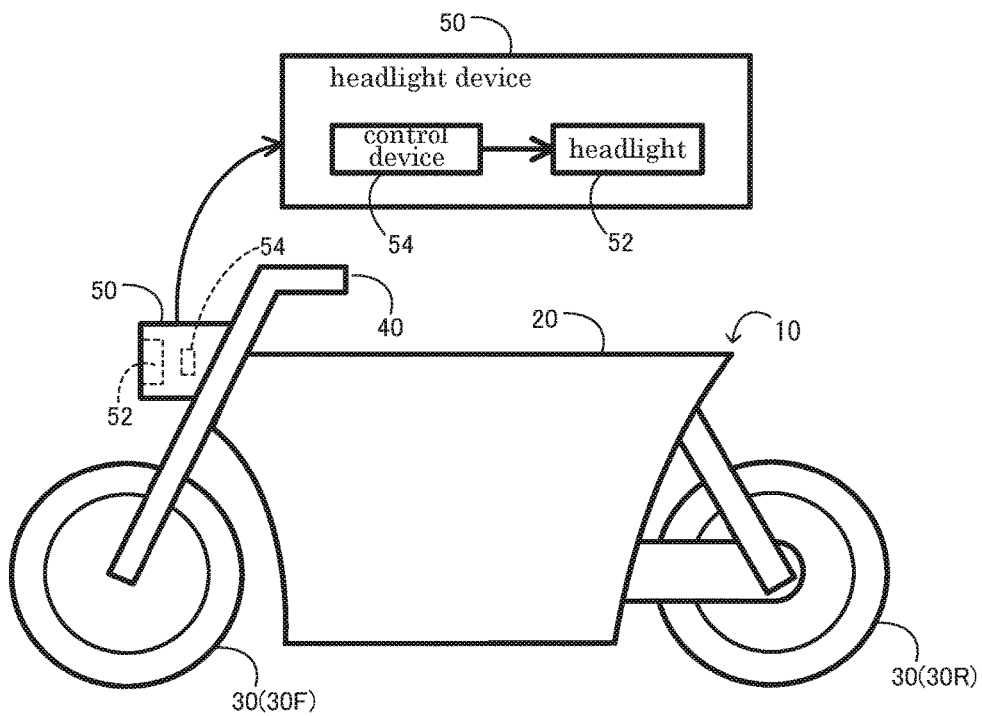
FIG. 1A shows a left side view of a leaning vehicle according to an embodiment of the present teaching and a block diagram of a headlight device employed in the leaning vehicle.

As shown in FIG. 1A, the leaning vehicle 10 includes a vehicle body 20, a plurality of wheels 30, and a handle 40. These will be descried below.

When the leaning vehicle turns left or right, the vehicle body 20 leans in the direction of the turn. Specifically, when the leaning vehicle 10 turns left, the vehicle body 20 leans leftward, and when the leaning vehicle 10 turns right, the vehicle body 20 leans rightward. The vehicle body 20 includes a vehicle body frame. A power unit is supported by the vehicle body frame. The power unit includes, for example, an engine serving as a drive source, a transmission, etc.

The vehicle body 20 supports the plurality of wheels 30. When the leaning vehicle 10 turns left, the plurality of wheels 30 leans leftward along with the vehicle body 20, and when the leaning vehicle 10 turns right, the plurality of wheels 30 leans rightward along with the vehicle body 20. The plurality of wheels 30 includes a front wheel 30F that is steered in accordance with operation of the handle 40 conducted by the rider, and a rear wheel 30R that is rotated by power transmitted from the power unit.

The leaning vehicle 10 further includes a headlight device 50. The headlight device 50 is configured to be employed in the leaning vehicle 10, which when turning left or right, leans in the direction of the turn. The headlight device 50 includes a headlight 52 and a control device 54.

The headlight 52 emits light in the ahead-driving direction of the leaning vehicle 10. The headlight 52 includes a plurality of light sources. Each of the plurality of light sources emits light in the ahead-driving direction of the leaning vehicle 10. The headlight 52 is supported by the vehicle body 20. When the vehicle body 20 leans, the headlight 52 leans along with the vehicle body 20.

Figure 1B:
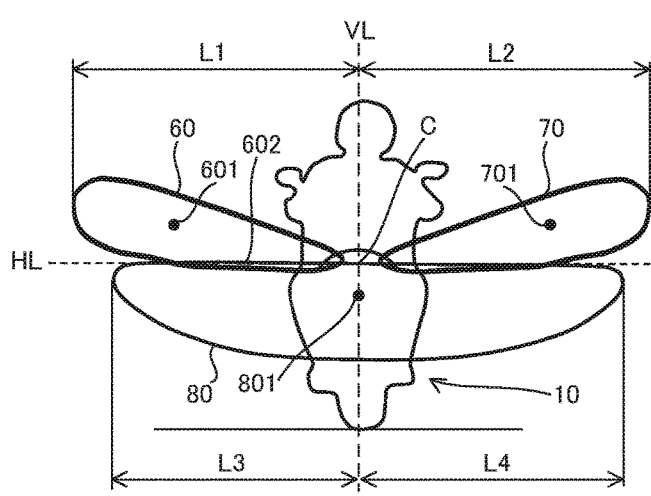
FIG. 1B is a diagram showing the distribution of light emitted from the headlight device when the leaning vehicle is upright.

As shown in FIG. 1B, the headlight device 52 is configured to light one left oblique area 60, one right oblique area 70 and one lower area 80. FIG. 1B is a view of the headlight device 50 from the back, and shows a state in which the headlight 52 is lighting all of the left oblique area 60, the right oblique area 70 and the lower area 80.

The left oblique area 60, when viewed from the back, has a fan-like shape spreading out from a lateral center point C that is positioned in the center, with respect to the left-right direction, of the leaning vehicle 10 and on a horizontal reference line HL. The left oblique area 60 has a maximum luminous intensity point 601 above the horizontal reference line HL. The left oblique area 60 is located in the ahead-driving direction of the leaning vehicle on the left. The left oblique area 60 has a lower edge 602 that is substantially parallel to the horizontal reference line HL. The lower edge 602 of the left oblique area 60 is positioned slightly below the horizontal reference line HL. The right oblique area 70 has a shape symmetrical with the left oblique area 60 with respect to a line VL that extends parallel to the up-down direction through the lateral center point C.

The lower area 80 has a roughly semi-elliptical shape with a curved lower edge. The lower area 80 has a maximum luminous intensity point 801 below the horizontal reference line HL. The lower oblique area 80 is located in the ahead-driving direction of the leaning vehicle 10. The lower oblique area 80 spreads out below the horizontal reference line HL from left to right. The lower oblique area 80 has an upper edge that is parallel to the left-right direction and is located on the horizontal reference line HL.

When the leaning vehicle 10 is upright, the left oblique area 60 and the right oblique area 70 each spread more outwardly in the left-right direction than the lower oblique area 80. The left oblique area 60 spreads farther to the left than the lower area 80, and the right oblique area 70 spreads farther to the right than the lower area 80. In the left-right direction of the leaning vehicle 10, the distance L1 from the left edge of the left oblique area 60 to the line VL, which extends parallel to the up-down direction through the lateral center point C, is longer than the distance L3 from the left edge of the lower area 80 to the line VL. In the left-right direction of the leaning vehicle 10, the distance L2 from the right edge of the right oblique area 70 to the line VL is longer than the distance L4 from the right edge of the lower area 80 to the reference line VL.

The control device 54 controls the headlight 52 such that when the leaning vehicle 10 is upright, all of the left oblique area 60, the right oblique area 70 and the lower area 80 are lit by the headlight 52. However, the control device 54 controls the lighting of the left oblique area 60 and the right oblique area 70 by the headlight 52 based on adaptive lighting control. The adaptive lighting control is controlling the lighting of the headlight 52 such that when there is an oncoming vehicle or a vehicle ahead in an area lit by the headlight 52, the headlight 52 reduces or turns off the light for the area.

Figure 1C:
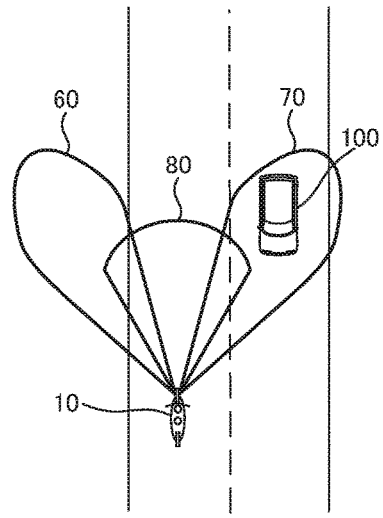
FIG. 1C is an illustration showing a situation in which the leaning vehicle encounters an oncoming vehicle.

With reference to FIG. 1C, for example, when the leaning vehicle 10 is moving in an upright posture, if there is no oncoming vehicle 100, the control device 54 instructs the headlight 52 to light all of the left oblique area 60, the right oblique area 70 and the lower area 80. When an oncoming vehicle 100 comes into the right oblique area 70, the control device 54 instructs the headlight 52 to reduce or turn off the light for the right oblique area 70. The entrance of the oncoming vehicle 100 into the right oblique area 70 is detected by a detection device (not shown), for example.

After the oncoming vehicle 100 goes out of the right oblique area 70, the control device 54 instructs the headlight 52 to light the right oblique area 70 as per normal again to restore the normal lighting.

As described above, with the headlight device 50 according to the embodiment, when there is no oncoming vehicle 100 (or vehicle ahead), the control device 54 instructs the headlight 52 to light all of the left oblique area 60, the right oblique area 70 and the lower area 80. This obtains good visibility in the ahead-driving direction of the leaning vehicle 10. When there is an oncoming vehicle 100 (and/or a vehicle ahead) in the left oblique area 60 and/or the right oblique area 70, the control device 54 exercises the adaptive lighting control so that the light for the left oblique area 60 and/or the right oblique area 70 is reduced or turned off. This makes it possible to suppress glare towards the oncoming vehicle 100 (and/or the vehicle ahead).

Figure 2:
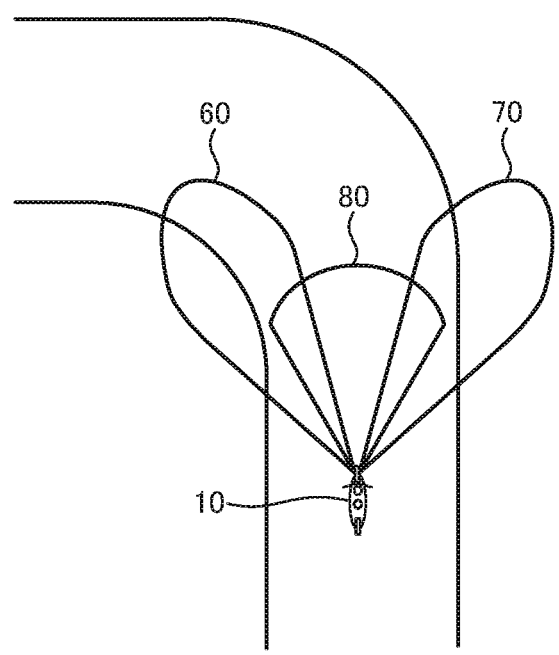
FIG. 2 is an illustration showing a situation before the leaning vehicle according to the embodiment turns left.

With the headlight device 50 according to the embodiment, the headlight 52 can light the left oblique area 60 having a maximum luminous intensity point 601 above the horizontal reference line HL and the right oblique area 70 having a maximum luminous intensity point 701 above the horizontal reference line HL. Moreover, the left oblique area 60 and the right oblique area 70 each spread more outwardly in the left-right direction than the lower area 80. Accordingly, for example, as shown in FIG. 2, when the leaning vehicle 10 turns left, a large area in the ahead-driving direction of the leaning vehicle 10 on the left is lit before the left turn, and thus, good visibility obliquely ahead is obtained.

(Modification 1 of Headlight Device)

In the above-described embodiment, there is only one left oblique area 60 and only one right oblique area 70. However, there may be a plurality of left oblique areas 60 and a plurality of right oblique areas 70.

Figure 3:
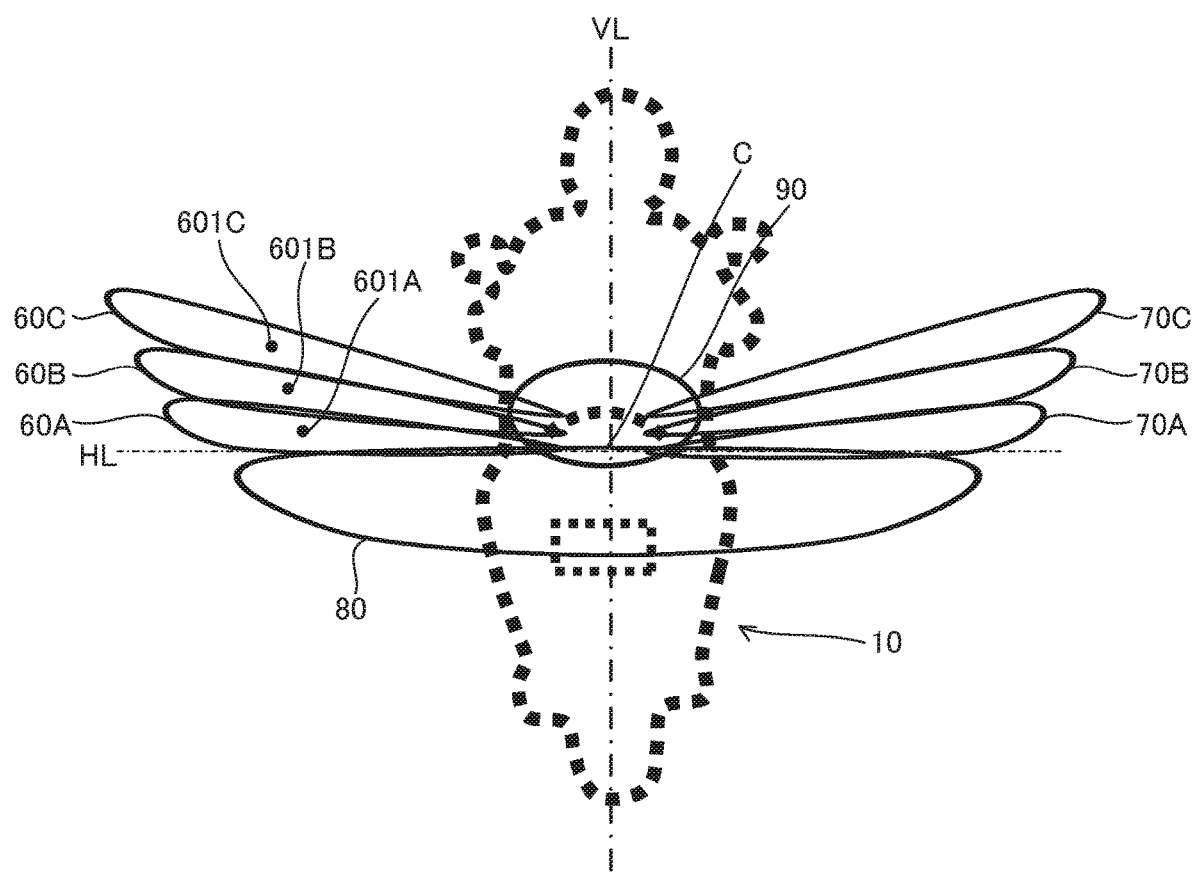
FIG. 3 is a diagram showing the distribution of light emitted from a headlight device according to Modification 1 of the embodiment.

FIG. 3 is a diagram showing the distribution of light emitted from a headlight device according to Modification 1 of the embodiment. With this headlight device, the headlight can light a plurality of left oblique areas 60A, 60B and 60C, a plurality of right oblique areas 70A, 70B and 70C, and one lower oblique area 80. The headlight includes a plurality of light sources that individually emit light towards the left oblique areas 60A to 60C, the right oblique areas 70A to 70C and the lower area 80.

The plurality of left oblique areas 60A to 60C are located at different heights in the up-down direction. More specifically, the plurality of left oblique areas 60A to 60C have maximum luminous intensity points 601A to 601C, respectively, that are positioned at different heights in the up-down direction. Among the plurality of left oblique areas 60A to 60C, an area located higher spreads more outwardly in the left-right direction than any other area located lower. Each of the plurality of left oblique areas 60A to 60C spreads farther to the left than the lower area 80. However, not all of the plurality of left oblique areas 60A to 60C are required to spread farther to the left than the lower area 80. All that is required is that at least one of the plurality of left oblique areas 60A to 60C spreads farther to the left than the lower area 80.

The plurality of right oblique areas 70A to 70C have shapes symmetrical with the plurality of left oblique areas 60A to 60C, respectively, with respect to the line VL extending parallel to the up-down direction through the lateral center point C. The plurality of right oblique areas 70A to 70C can be described by switching the word "left" to "right" in the above description of the plurality of left oblique areas 60A to 60C, and any detailed description thereof is not given.

The headlight 52 further can light a high-beam area 90 located between the plurality of left oblique areas 60A to 60C and the plurality of right oblique areas 70A to 70C. The control device 54 may, but need not, apply the adaptive lighting control to the lighting of the high-beam area 90. When the control device 54 does not apply the adaptive lighting control to the lighting of the high-beam area 90, the lighting of the high-beam area 90 is controlled, for example, by a switch operated by the rider.

Figure 4A:
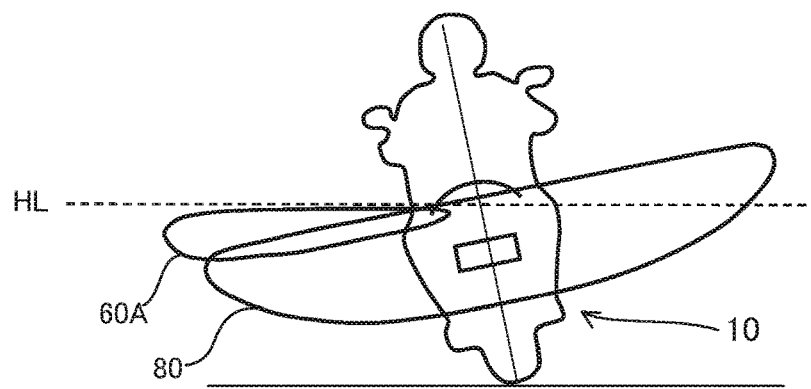
FIG. 4A is a diagram showing the distribution of light emitted from the headlight device according to Modification 1 of the embodiment when the leaning vehicle employing the headlight device leans.
Figure 4B:
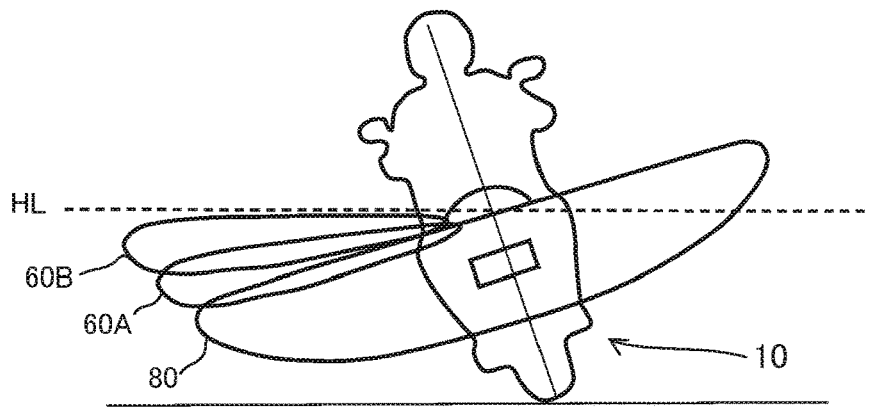
FIG. 4B is a diagram showing the distribution of light emitted from the headlight device when the leaning vehicle leans more from the state shown in FIG. 4A.
Figure 4C:
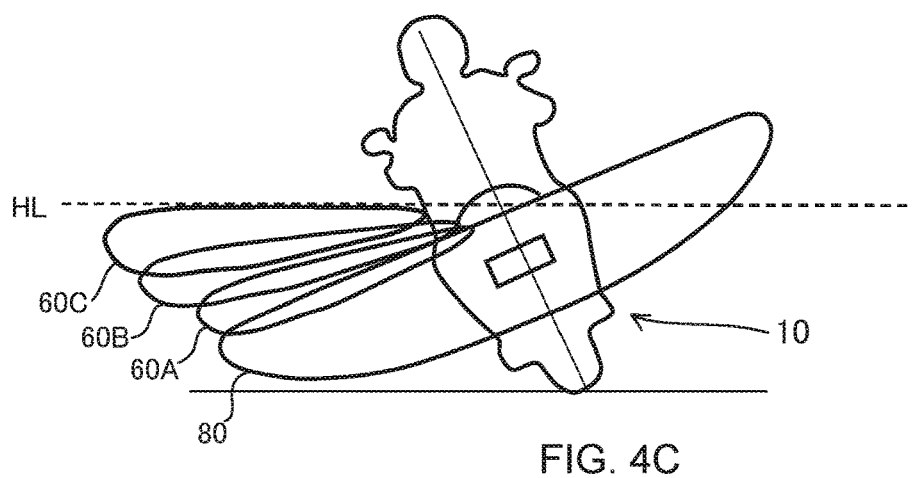
FIG. 4C is a diagram showing the distribution of light emitted from the headlight device when the leaning vehicle leans still more from the state shown in FIG. 4B.

When the leaning vehicle 10 is upright, the control device 54 instructs the headlight 52, for example, to light the lower oblique area 80, the left oblique area 60A located nearest to the horizontal reference line HL and the right oblique area 70A located nearest to the horizontal reference line HL. With reference to FIGS. 4A-4C, the effect of the headlight device of Modification 1 will be described.

FIGS. 4A-4C show the distribution of light emitted from the headlight device of Modification 1 of the embodiment when the leaning vehicle employing the headlight device leans, and the lean angle of the vehicle body increases as shown by FIGS. 4A-4C in this order.

For example, when the leaning vehicle 10 is upright, the control device 54 instructs the headlight 52 to light the lower oblique area 80, the left oblique area 60A located nearest to the horizontal reference line HL and the right oblique area 70A (not shown) located nearest to the horizontal reference line HL. When the leaning vehicle 10 leans from this state leftward to a certain degree, as shown in FIG. 4A, the left oblique area 60A comes down to a position lower than the horizontal reference line HL.

As shown in FIG. 4B, when the leaning vehicle 10 leans leftward more, the left oblique area 60A comes down to a position still lower than the horizontal reference line HL, and an unlit area appears between the left oblique area 60A and the horizontal reference line HL. Therefore, the control device 54 instructs the headlight 52 to light not only the left oblique area 60A but also the left oblique area 60B located one level higher than the left oblique area 60A.

As shown in FIG. 4C, when the leaning vehicle 10 leans leftward still more, as in the case described above, the control device 54 instructs the headlight 52 to light not only the left oblique areas 60A and 60B but also the left oblique area 60C located two level higher than the left oblique area 60A.

In this way, as the lean angle of the leaning vehicle 10 increases, the control device 54 controls the headlight 52 such that the lights for the left oblique areas 60B and 60C, which were turned off or reduced when the leaning vehicle 10 was upright, are turned on or turned up in order from the lower to the upper. Thereby, not only when the leaning vehicle 10 is upright but also when the leaning vehicle 10 leans, good visibility ahead can be obtained.

When the leaning vehicle 10 is upright, the control device 54 may instruct the headlight 52 to light the lower area 80, two or more of the left oblique areas 60A to 60C and two or more of the right oblique areas 70A-70C.

(Modification 2 of Headlight Device)

In the above-described embodiment, there is only one lower area 80. However, there may be a plurality of lower areas 80.

Figure 5A:
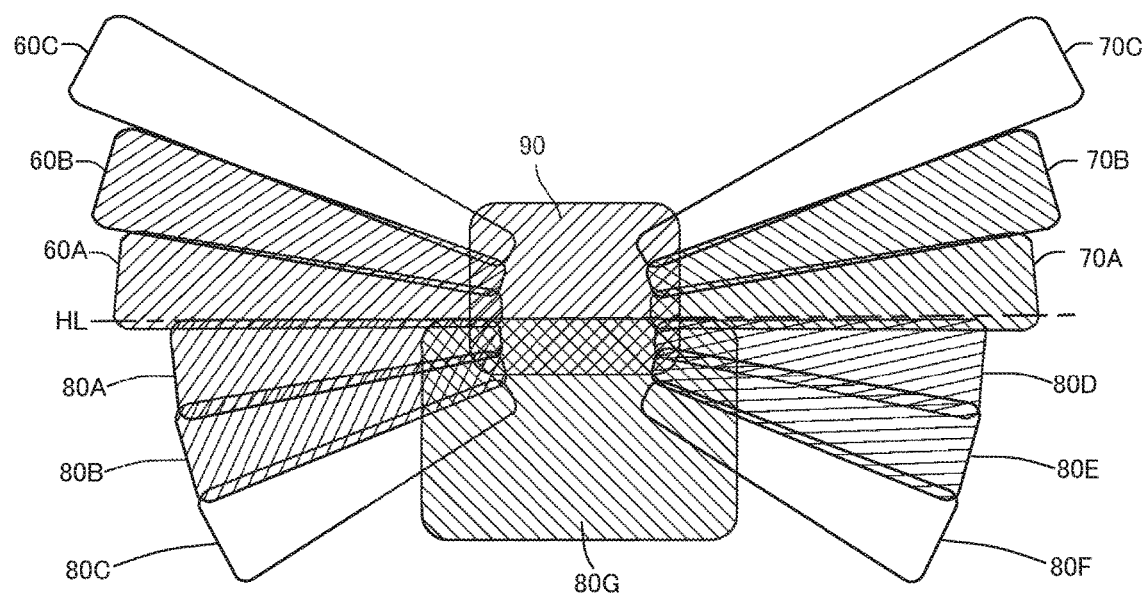
FIG. 5A is a diagram showing the distribution of light emitted from a headlight device according to Modification 2 of the embodiment.

FIG. 5A is a diagram showing the distribution of light emitted from a headlight device according to Modification 2 of the embodiment. With this headlight device, the headlight can light a plurality of left oblique areas 60A-60C, a plurality of right oblique areas 70A-70C and a plurality of lower areas 80A-80G.

Among the plurality of lower areas 80A-80G, the lower area 80G located in the center portion, with respect to the left-right direction, of the leaning vehicle 10 is defined as a low-beam area. The lower area 80G has an upper edge that extends on the horizontal reference line HL.

On the left of the lower area 80G, the lower areas 80A to 80C are positioned at different heights in the up-down direction. On the right of the lower area 80G, the lower areas 80D to 80F are positioned at different heights in the up-down direction.

When the leaning vehicle 10 is upright, the control device 54 instructs the headlight 52 to light one or some of the plurality of left oblique areas 60A to 60C. Meanwhile, the control device 54 instructs the headlight 52 to reduce or turn off the light for the other left oblique area(s). More specifically, the control device 54 performs control such that the left oblique area 60A located nearest to the horizontal reference line HL and the left oblique area 60B located one level higher than the left oblique area 60A are lit and that the light for the other left oblique area 60C is reduced or turned off. The lighting of the plurality of right oblique areas 70A-70C is controlled in the same way.

When the leaning vehicle 10 is upright, the control device 54 instructs the headlight 52 to light one or some of the plurality of lower areas 80A to 80G. Meanwhile, the control device 54 instructs the headlight 52 to reduce or turn off the light for the other lower area(s). More specifically, the control device 54 controls the lighting of the lower areas 80A to 80C on the left such that the lower area 80A located nearest to the horizontal reference line HL and the lower area 80B one level lower than the lower area 80A are lit and that the light for the other lower area 80C is reduced or turned off. The lighting of the lower areas 80D to 80F on the right is controlled in the same way. The control device 54 also instructs the headlight 52 to light the lower area 80G in the center and the high-beam area 90.

Figure 5B:
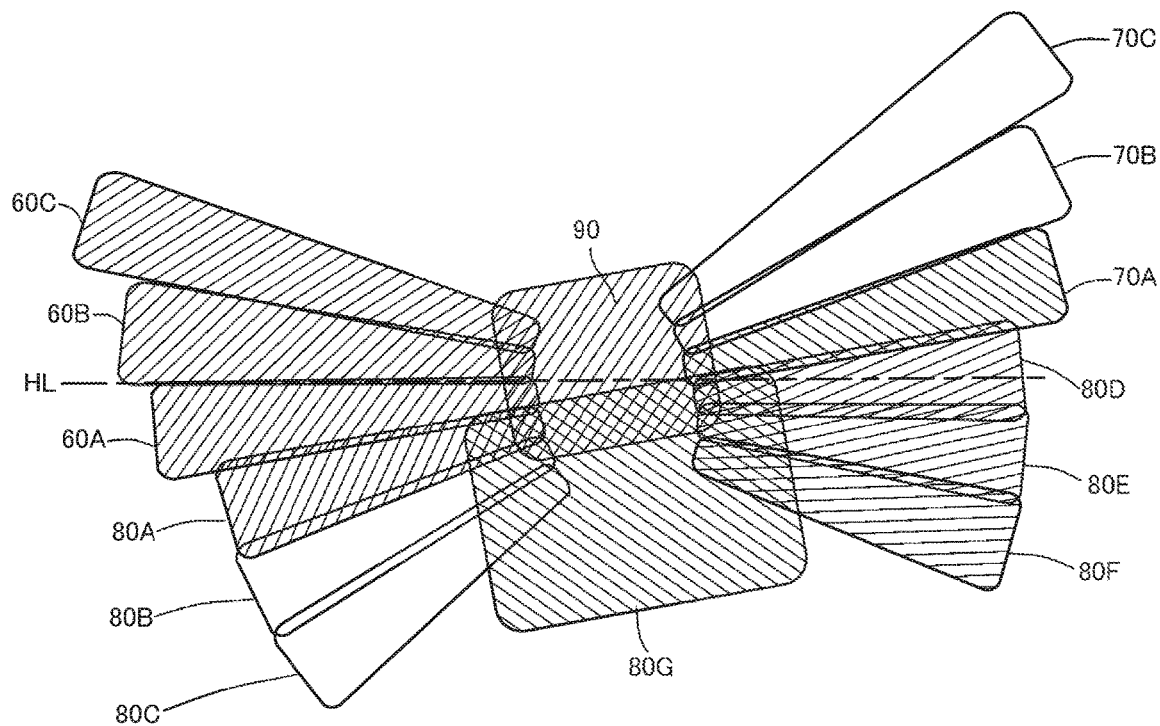
FIG. 5B is a diagram showing the distribution of light emitted from the headlight device when the leaning vehicle leans from the state shown in FIG. 5A.

As shown in FIG. 5B, when the leaning vehicle 10 leans leftward or rightward, the control device 54 controls the headlight 52 such that depending on the lean angle of the vehicle body 20 in the leaning direction, the lit area on the left or right corresponding to the leaning direction shifts upward and that the lit area on the opposite side shifts downward.

More specifically, in the example shown by FIG. 5B, when the leaning vehicle 10 turns left, the control device 54 performs control such that the left oblique area 60C, which is lit by a reduced light or is unlit when the leaning vehicle is upright, becomes normally lit, so that all of the left oblique areas 60A to 60C become normally lit. Meanwhile, the control device 54 performs control such that the right oblique area 70B, which is normally lit when the leaning vehicle is upright, becomes lit by a reduced light or unlit, so that only the right oblique area 70A is normally lit.

Additionally, the control device 54 controls the lighting of the lower oblique areas 80A to 80C located on the left such that the lower area 80B, which is normally lit when the leaning vehicle is upright, becomes lit by a reduced light or unlit, so that only the lower area 80A located highest is normally lit. Meanwhile, the control device 54 controls the lighting of the lower areas 80D to 80F on the right such that the lower area 80F, which is lit by a reduced light or unlit when the leaning vehicle is upright, becomes normally lit, so that all of the lower areas 80D-80F become normally lit. The control device 54 controls the lighting of the lower area 80G in the center and the high-beam area 90 such that these areas 80G and 90 are kept normally lit both when the leaning vehicle is upright and when the leaning vehicle turns.

The lean angle of the vehicle body 20 is based on the upright position of the vehicle body 20. The lean angle of the vehicle body 20 is an inclined angle of the vehicle body 20 from the upright position. The lean angle of the vehicle body 20 is detected by a lean angle sensor configured to detect the lean angle of the vehicle body 20. A signal indicating the lean angle of the vehicle body 20 detected by the lean angle sensor is received in the control device 54.

Thus, when the leaning vehicle 10 turns left or right, the control device 54 controls the lighting of the plurality of left oblique areas 60A to 60C, the plurality of right oblique areas 70A to 70C and the plurality of lower areas 80A to 80G without operation by the rider of the leaning vehicle 10. With this headlight device 50, depending on the leftward or rightward lean angle, the lights for the areas on the right and left can be automatically turned on, reduced, or turned off. This obtains the rider of the leaning vehicle 10 good visibility ahead and offers the rider a more comfortable ride as well.

The embodiments and modifications described above and/or illustrated by the drawings are to make the present disclosure easier to understand and not to limit the concept of the present disclosure. It is possible to adapt or alter the embodiments and modifications described above without departing from the gist thereof. The gist includes all equivalent elements, modifications, omissions, combinations (for example, combinations of features of the embodiments and modifications), adaptations and alterations as would be appreciated by those in the art based on the embodiments and modifications disclosed herein. The limitations in the claims are to be interpreted broadly based on the language employed in the claims and not limited to the embodiments and modifications described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

LIST OF REFERENCE SIGNS

10: leaning vehicle
20: vehicle body
50: headlight device
52: headlight
54: control device
60, 60A-60C: left oblique area
601, 601A-601C: maximum luminous intensity point
70, 70A-70C: right oblique area
701: maximum luminous intensity point
80, 80A-80G: lower area
801: maximum luminous intensity point
90: high-beam area
100: oncoming vehicle
HL: horizontal reference line

The invention claimed is:

1. A headlight device to be employed in a leaning vehicle that has a vehicle body leaning leftward when turning left and leaning rightward when turning right, the headlight device comprising:
a headlight including a plurality of light sources, which is configured to respectively light a plurality of areas that include:
a plurality of left oblique areas that are located in an ahead-driving direction, and on the left, with respect to the headlight of the leaning vehicle, the plurality of left oblique areas each having a maximum luminous intensity point thereof above a horizontal reference line,
a plurality of right oblique areas that are located in the ahead-driving direction, and on the right, with respect to the headlight of the leaning vehicle, the plurality of right oblique areas each having a maximum luminous intensity point thereof above the horizontal reference line, and
one or more lower areas that are located in the ahead-driving direction with respect to the headlight of the leaning vehicle, the one or more lower areas each having a maximum luminous intensity point thereof below the horizontal reference line; and
a control device that controls the headlight to light at least the plurality of left oblique areas and the plurality of right oblique areas based on adaptive lighting control, such that when an oncoming vehicle or a vehicle ahead is in one of the areas lit by the headlight, the light for the one area is reduced or turned off, wherein:
the plurality of left oblique areas are located at different heights in an up-down direction, and among the plurality of left oblique areas, one that is higher spreads more outwardly in the left-right direction than another one therebelow,
the plurality of right oblique areas are located at different heights in the up-down direction, and among the plurality of right oblique areas, one that is higher spreads more outwardly in the left-right direction than another one therebelow,
when the leaning vehicle is upright, the control device instructs the headlight to light at least one of the plurality of left oblique areas, at least one of the plurality of right oblique areas, and at least one of the one or more lower areas, each of said at least one left oblique area and said at least one right oblique area being lit based on the adaptive lighting control and spreading more outwardly in a left-right direction than any of said at least one lower area, and
wherein when the leaning vehicle is upright, the horizontal reference line extends in the left-right direction through an upper edge of a low-beam area, the low-beam area being one of the one or more lower areas that is at a center with respect to the left-right direction.

2. The headlight device according to claim 1, wherein each of the plurality of light sources has a luminous intensity of a specified candela value or more.

3. The headlight device according to claim 1, wherein when the leaning vehicle is upright, the total amount of light for lighting the one or more lower areas is equal to or greater than an amount of light for lighting each of the at least one of the left oblique areas, or for lighting each of the at least one of the right oblique areas, that is controlled based on the adaptive lighting control.

4. A leaning vehicle comprising the headlight device according to claim 1.

5. The headlight device according to claim 1, wherein the horizontal reference line remains the same irrespective of a lean angle of the leaning vehicle, and
the plurality of light sources are configured to, when the leaning vehicle turns, light each of the left oblique areas and the right oblique areas below the horizontal reference line with a first amount of light, while the rest of the left oblique areas and the right oblique areas are unlit or lit with a second amount of light that is lower than the first amount.

6. The headlight device according to claim 1, wherein the one or more lower areas includes, in addition to the low-beam area, at least one left lower area and at least one right lower area respectively on two sides of the low-beam area with respect to the left-right direction, and
when the leaning vehicle is upright, the horizontal reference line extends in the left-right direction through an upper edge of an uppermost one of the at least one left lower area and that of an uppermost one of the at least one right lower area.

7. The headlight device according to claim 6, wherein the plurality of light sources are configured to light only ones of the plurality of light sources that are adjacent in the up-down direction to the horizontal reference line, irrespectively of a lean angle of the leaning vehicle.

* * * * *